F. HIRSCH.
SCREW CUTTING MACHINE.
APPLICATION FILED JUNE 3, 1910.
1,064,218.
Patented June 10, 1913.
2 SHEETS—SHEET 2.
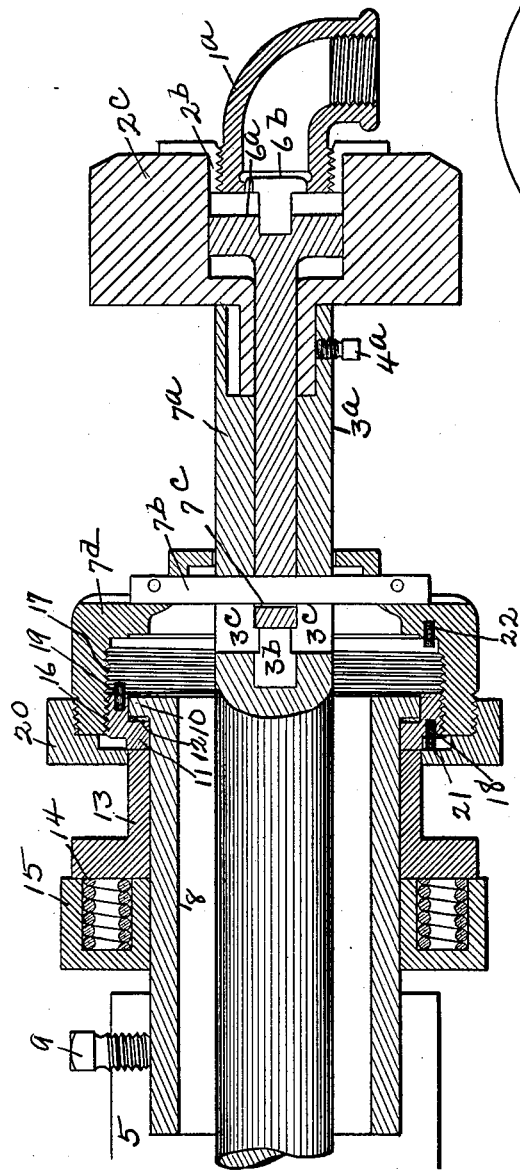
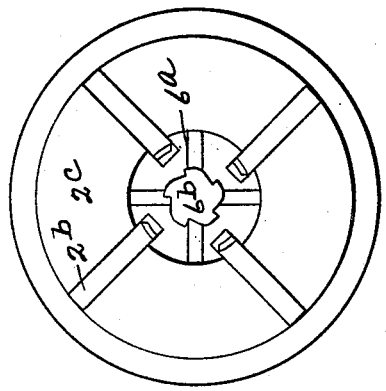

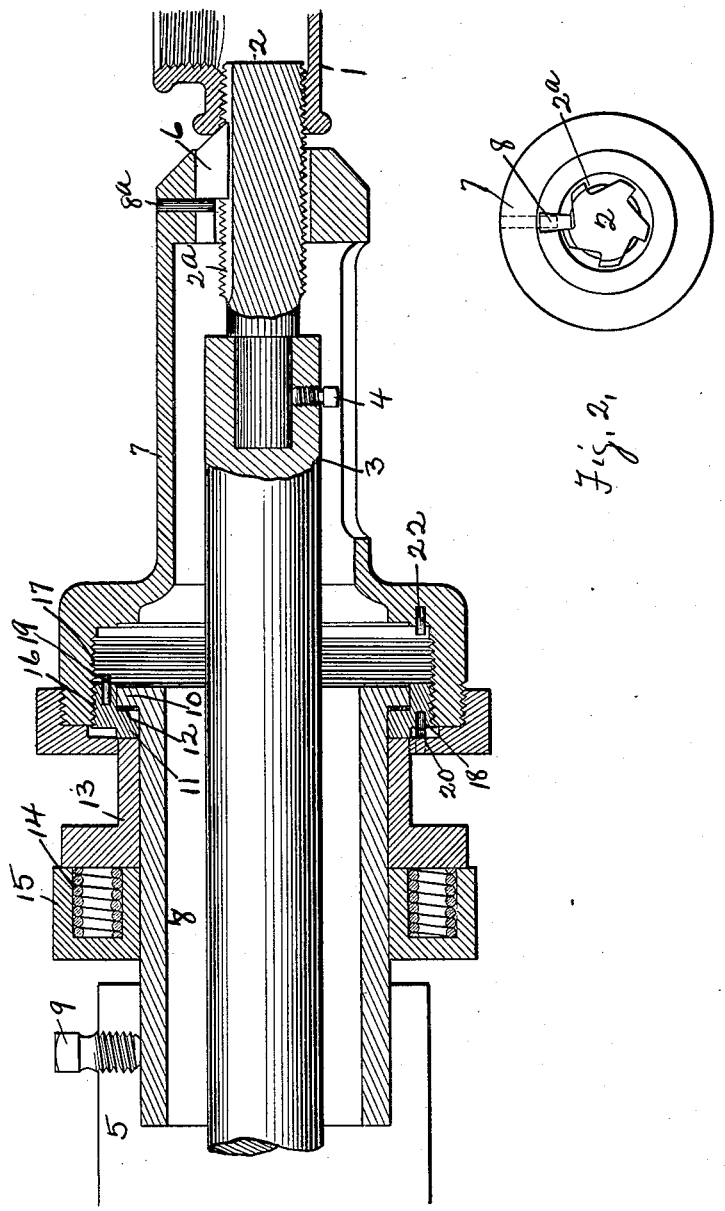

UNITED STATES PATENT OFFICE.

FRANK HIRSCH, OF ERIE, PENNSYLVANIA, ASSIGNOR TO JARECKI MANUFACTURING COMPANY, OF ERIE, PENNSYLVANIA, A CORPORATION OF PENNSYLVANIA.

SCREW-CUTTING MACHINE.

1,064,218.    Specification of Letters Patent.    Patented June 10, 1913.

Application filed June 3, 1910. Serial No. 564,821.

*To all whom it may concern:*

Be it known that I, FRANK HIRSCH, a citizen of the United States, residing at Erie, in the county of Erie and State of Pennsylvania, have invented new and useful Improvements in Screw-Cutting Machines, of which the following is a specification.

This invention relates to improvements in screw cutting machines, and consists in certain improvements in the construction thereof as will be hereinafter fully described and pointed out in the claims.

More particularly, the invention relates to screw cutting machines for cutting screws on pipe fittings. These fittings usually have more or less irregular faces, particularly that part of the face formed at the parting of the mold. This irregularity in the face of the fitting often interferes materially with the ready entering of the pipe into the fitting. For this reason, it has been found desirable to face the end of the fitting, and where the fitting is interiorly screw threaded, it is preferable to make this face tapering, so as to assist in the entering of the pipe, and also to reduce the amount of stock necessary to be removed to secure an even face. Some fittings such as unions, are faced not only to facilitate the entering of the threads of the pipe, but also to receive the usual gasket to make a better fit with the other part of the union and steam tight joint.

The object of this invention is to face the fitting, preferably simultaneously, with the cutting of the screw.

The invention is illustrated in the accompanying drawings as follows:

Figure 1 shows a central section of the machine arranged to cut an interiorly screw threaded fitting; Fig. 2 an end view of the same; Fig. 3 an alternative construction, showing the machine arranged to face an exteriorly threaded fitting; Fig. 4 an end view of the construction shown in Fig. 3.

In the construction shown in Fig. 1, 1 marks the fitting; 2 the tap; $2^a$ the usual clearance groove in the tap; 3 the spindle; 4 a set screw for securing the tap in the spindle; 5 a head in which the spindle is mounted. These are of common construction, the spindle being given a rotary motion, and either the fitting or the spindle being fed as the screw is formed. After the screw is formed, the spindle is reversed to back out the tap. The face cutter 6 is arranged in one of the grooves of the tap, the tap having the usual clearance grooves $2^a$. It is carried by a face cutter spindle 7. It is preferably of dovetailed shape, and arranged in a dovetailed groove 8, and its inner movement limited by a pin $8^a$.

The mounting for the face cutter spindle 7 is as follows: An auxiliary head 8 is mounted in the head 5, and secured in place by a set screw 9. A shoulder 10 is arranged on the front end of the auxiliary head 8, and a normally stationary feed screw ring 11 is journaled on the auxiliary head 8. A friction washer 12 is placed between the shoulder 10 and the ring 11. A follower 13 is mounted on the auxiliary head 8, and is pressed against the ring 11 by means of the springs 14 in the collar 15. These springs exert sufficient pressure normally to hold the ring 11 in a fixed or stationary position, but yield after the completion of the cut to stop the feeding motion. The ring 11 has the screw threads 16 on its outer periphery, on which the screw threads 17 on the interior of the face cutting spindle 7 operate. The ring 11 has the stop pin 18 on its rear face, and the stop pin 19 on its front face. A stop pin 20 is arranged in a plunger collar 21 secured on the end of the face cutter spindle 7, the pin 20, therefore, being fixed with the cutter spindle 7. The pin 18 is arranged in the path of the pin 20, so that when the face cutter spindle 7 reaches the desired inner limit of its feed, the pin 20 engages the pin 18, and thus fixes it with the ring 11, after which the ring 11 rotates with the cutter spindle, and the forward or feeding movement of the cutter face spindle ceases as the two parts,—the ring 11 and spindle 7—rotate together. The spindle 7 is driven both in its feeding movement and backing out movement, by the cutter 6 acting as a key in one of the grooves of the tap 2. The groove, therefore, not only permits of the proper locating of the cutter so as to face the end of the fitting to the inner edge of the thread, but it also acts as a key way. The stop 22 on the interior of the face cutter spindle 7 limits the backing out movement of the cutter spindle 7 relatively to the tap. This is accomplished by the pin 22, coming into contact with the pin 19 on the ring 11 at the desired end of the movement. Any movement may be given to the cutter by extending the screw 17 or the stop pins.

The operation of the device will be readily understood from the foregoing description. The fitting is brought into position, and either the fitting moves to the tap or the tap to the fitting, the tap rotating forwardly. As the tap rotates forwardly, it cuts the thread, and at the same time rotates the face cutter spindle, thus feeding it forward. The feed screw of the face cutter spindle is preferably pitched to feed the cutter forward less rapidly than the tap, thus a more gradual cut may be taken, and of course, after the pin 20 contacts, the pin 18 stops the forward movement of the face cutter, and the continuing rotation, finishes the face, so that it has a uniform surface throughout the circumference of the fitting. Not only this, but any tendency to form a bur in the face of the fitting is prevented by the cutter. As the tap is reversed, the stop pin 20 moves away from the pin 18, and at the completion of one rotation is moved axially sufficiently to clear the pin 18, so as to permit of the continued rotation of the spindle 7, relatively to the ring 11, so that the face cutter is backed off with the tap. The rearward movement of the cutter continues until the pin 22 contacts the pin 19 after which the rotation of the tap continues the rear movement of the tap relatively to the cutter to bring it into position to start a new operation.

In the alternative construction, 1ª marks the pipe fitting; 2ᵇ the dies for cutting the exterior threads. These are carried in the die head 2ᶜ. The die head is carried by a spindle 3ª, and is secured in the spindle by the set screw 4ª. The cutter comprises the interior cutting tool 6ᵇ for facing the inner surface of the fitting, and the face cutting tool 6ª. The cutter has the spindle 7ª and extends into the socket 3ᵇ in the spindle 3ª. A pin 7ᵇ extends through the perforation 7ᶜ in the rear end of the spindle 7ª. This pin extends through the slots 3ᶜ in the spindle 3ª and is secured to the spindle head 7ᵈ. The spindle head 7ᵈ is similar to the spindle on the head 7, and the other parts are similar to the parts in Fig. 1, and operate in the same manner.

By the use of the term face cutter, I do not mean necessarily a cutter cutting a face at right angles to the axis but any finishing tool for facing the end, as, for instance, the cutter 6ᵇ as distinguished from a screw thread cutter.

What I claim as new is:

1. In a screw cutting machine, the combination of a spindle; a face cutter rotated with the spindle; a screw cutter carried by the spindle; a feed screw; and means connecting the face cutter and feed screw to give to the face cutter through a part of its travel a feed movement directly following the feed movement of the screw.

2. In a screw cutting machine, the combination of a spindle; a face cutter rotated with the spindle; a screw cutter carried by the spindle; a feed screw; and means mounted concentric with the spindle connecting the face cutter and feed screw to give to the face cutter through a part of its travel a feed movement directly following the feed movement of the screw.

3. In a screw cutting machine, the combination of a spindle; a face cutter rotating with the spindle; a screw cutter carried by the spindle, said face cutter and screw cutter being movable relatively to each other in an axial direction; and feeding means concentric with the spindle for feeding axially said face cutter and screw cutter different distances.

4. In a screw cutting machine, the combination of a spindle; a face cutter rotating with the spindle; a screw cutter carried by the spindle; screw actuated means concentric with the spindle for feeding said face cutter and screw cutter and devices for varying the axial movement of the face cutter relatively to the screw cutter.

5. In a screw cutting machine, the combination of a spindle; a face cutter rotating with the spindle; a screw cutter carried by the spindle; means for feeding axially the face cutter with the screw cutter; and devices for arresting the feed movement of the face cutter independently of the screw cutter.

6. In a screw cutting machine, the combination of a spindle; a face cutter rotating with the spindle; a screw cutter carried by the spindle; means for feeding axially the face cutter with the screw cutter; and devices for arresting the movement of the face cutter independently of the screw cutter and for automatically retracting the face cutter with the screw cutter.

7. In a screw cutting machine, the combination of a spindle; a face cutter rotating with the spindle; a screw cutter carried by the spindle; means mounted concentric with the spindle for feeding the face cutter and screw cutter; and devices for arresting the feed movement of the face cutter independently of the screw cutter.

8. In a screw cutting machine, the combination of a spindle; a screw cutting device on the spindle; a face cutter; a screw feed for the face cutter comprising a rotating member moving with the face cutter and a normally stationary member; and means for yieldingly holding the stationary member.

9. In a screw cutting machine, the combination of a spindle; a screw cutting device on the spindle; a face cutter; a screw feed for the face cutter comprising a rotating member moving with the face cutter and a normally stationary member; means for yieldingly holding the stationary member and devices on the members for locking the normally stationary member with the rotating member to limit the feeding movement.

10. In a screw cutting machine, the combination of a spindle; a screw cutting device on the spindle; a face cutter; a screw feed for the face cutter comprising a rotating member moving with the face cutter and a normally stationary member; means for yieldingly holding the stationary member; and devices on the members for locking the normally stationary member with the rotating member to limit the axial movement of the face cutter in both directions.

11. In a screw cutting machine, the combination of a spindle; a tap carried by the spindle, said tap having a clearance groove; a face cutter arranged in the clearance groove; a screw feed for the face cutter, comprising a rotating member moving with the face cutter, and a normally stationary member; means for yieldingly holding the normally stationary member to produce the feeding movement; and devices on the members for locking the normally stationary member with the rotating member to limit the feeding movement.

12. In a screw cutting machine, the combination of a spindle; a screw cutting device on the spindle; a face cutter; a screw feed for the face cutter comprising a rotating member moving with the screw cutter and a normally stationary member; a friction device for yieldingly holding the normally stationary member; and devices on the members for locking the stationary member with the rotating member to limit the feeding movement.

13. In a screw threading machine, the combination of a spindle, a tap arranged in the spindle, said tap having a clearance groove; a face cutter arranged in said groove, the tap being arranged to drive the cutter, through the engagement of the cutter with the walls of the groove; a screw feed for the cutter comprising a rotating member moving with the cutter and a normally stationary member; means for yieldingly holding the normally stationary member; and devices on the members for locking the normally stationary member with the rotating member to limit the feeding movement.

14. In a screw threading machine, the combination of a spindle; a screw threading device on the spindle; a face cutter; a head in which the spindle is mounted; an auxiliary head secured thereto; a screw threaded feed ring arranged on the auxiliary head; devices on the auxiliary head for frictionally holding said screw threaded feed ring from rotation relatively to the head; a face cutter spindle secured to the face cutter and having a screw thread engaging the screw thread on the feed ring; and stops for limiting the relative movement of the feed ring and spindle.

In testimony whereof, I have hereunto set my hand in the presence of two subscribing witnesses.

FRANK HIRSCH.

Witnesses:
C. D. HIGBY,
ROBERT JARECKI.

Copies of this patent may be obtained for five cents each, by addressing the "Commissioner of Patents, Washington. D. C."